(12) United States Patent
Watanabe

(10) Patent No.: US 6,973,019 B2
(45) Date of Patent: Dec. 6, 2005

(54) RECORDING MEDIUM REPRODUCING APPARATUS

(75) Inventor: Jyoji Watanabe, Tochigi (JP)

(73) Assignee: Denon, Ltd., Tokyo (JP)

( * ) Notice: Subject to any disclaimer, the term of this patent is extended or adjusted under 35 U.S.C. 154(b) by 590 days.

(21) Appl. No.: 10/244,751

(22) Filed: Sep. 17, 2002

(65) Prior Publication Data

US 2003/0152004 A1  Aug. 14, 2003

(30) Foreign Application Priority Data

Feb. 12, 2002  (JP)  ............................. 2002-033674

(51) Int. Cl.$^7$ ................................................. G11B 7/00
(52) U.S. Cl. .................... 369/53.2; 369/53.29
(58) Field of Search .......................... 369/53.19, 53.2, 369/53.11, 53.29, 53.31

(56) References Cited

U.S. PATENT DOCUMENTS 6,215,754 B1   4/2001   Vidal et al.
6,283,764 B2 *  9/2001  Kajiyama et al. ........ 434/307 A

FOREIGN PATENT DOCUMENTS

| EP | 0 477 815 A1 | 1/1992 |
| EP | 02256507.1 | 6/2003 |
| JP | 2000-260108 | 9/2000 |
| JP | 2001-266554 | 9/2001 |

* cited by examiner

Primary Examiner—Nabil Hindi
(74) Attorney, Agent, or Firm—Dickstein Shapiro Morin & Oshinsky LLP

(57) ABSTRACT

In a recording medium reproducing apparatus that can reproduce a recording medium such as a CD-R or CD-RW recording therein compressed audio data, a track number of three or more digits can be indicated using an existing display portion that is designed to indicate a track number in two digits. For this, the apparatus determines whether digital audio data to be reproduced is compressed audio data, and when it is determined to be the compressed audio data, the apparatus indicates a track number of the reproducing compressed audio data in a track number display area and a minute display area, a value of minute of a reproduction time of the compressed audio data in a second display area, and a value of second of the reproduction time of the compressed audio data in a frame display area.

2 Claims, 5 Drawing Sheets

RECORDING MEDIUM REPRODUCING APPARATUS

BACKGROUND OF THE INVENTION

The present invention relates to a recording medium reproducing apparatus for reproducing compressed audio data and non-compressed audio data recorded in a recording medium.

An optical disk such as a CD-DA (Compact Disc-Digital Audio), CD-R (Compact Disc-Recordable) or CD-RW (Compact Disc-ReWritable) is provided with a lead-in area, a program area and a lead-out area from the radially innermost side to the radially outermost side. TOC (Table of Contents) information recorded in a TOC area within the lead-in area includes index information representing a track number of each track recorded in the program area, and an absolute time (minute, second, frame) of a reproduction start position and a reproduction end position of each track. By reproducing the index information, a recording medium reproducing apparatus such as a CD player can indicate a track number and a reproduction time (minute, second, frame) in a display portion of the CD player.

There have been available data compression techniques such as MP3 (MPEG Audio Layer-3). In the MP3 compression technique, audio data can be compressed to about one-tenth of the original data amount without substantially deteriorating the original sound quality. The compressed audio data can be recorded as a file on an optical disk such as a CD-R or CD-RW using a computer, and can be reproduced by, for example, a CD player which supports the MP3 compression technique.

SUMMARY OF THE INVENTION

As described above, if audio data is compressed using, for example, the MP3 compression technique, the audio data of about 10 CD-DAs can be recorded in one CD-R or CD-RW. Accordingly, it is not necessary for, particularly, those users such as disc jockeys who handle a lot of audio data, to carry many CDs if they use CD-Rs or the like recording therein compressed audio data. In view of this, there has been a demand for such a CD player that can play back a CD-R or the like recording therein compressed audio data.

On the other hand, if compressed audio data is recorded in one CD-R or the like, it is expected that the number of tracks thereof will exceed the maximum track number of 99 that can be recorded in one CD-DA. Therefore, in case of a recording medium reproducing apparatus such as a conventional CD player having a display portion for indicating a track number in two digits, it is expected that the number of digits provided in the display portion will be insufficient when compressed audio data recorded in a CD-R or the like is reproduced.

For solving the foregoing problem, it may be suggested to provide a display portion that can indicate a track number in three or more digits. However, the size of the display portion changes as the number of digits increases, and thus it is even decompressed that a design of the entire CD player should be changed.

On the other hand, when compressed audio data recorded in a CD-R or the like is reproduced by a CD player, the compressed audio data is decompressed per block and stored in a memory. Thus, only those audio data stored in the memory can be reproduced. Therefore, it is possible that a function that can be used when non-compressed audio data is reproduced, for example, a hot start function wherein when reproduction is started from a desired track position, sound is outputted in a moment, or a scratch reproducing function, can not be used when compressed audio data is reproduced.

The present invention has been made for solving the foregoing problems. It is an object of the present invention to make it possible that, in a recording medium reproducing apparatus that can play back a recording medium such as a CD-R or CD-RW recording therein compressed audio data, a track number of three or more digits can be indicated using an existing display portion that is designed to indicate a track number in two digits. It is a further object of the present invention to make it possible to inform a user that the function usable for reproducing the non-compressed audio data is not usable if the reproducing data is compressed audio data.

In order to solve the problem according to the present invention, there is provided a recording medium reproducing apparatus having a reproducing portion for reproducing compressed audio data and non-compressed audio data recorded in recording media, the recording medium reproducing apparatus comprising: a display portion comprising a track number display area for indicating a track number of the non-compressed audio data, a minute display area for indicating a value of minute of a reproduction time of the non-compressed audio data, a second display area for indicating a value of second of the reproduction time of the non-compressed audio data, and a frame display area for indicating a value of frame of the non-compressed audio data; and a discriminating portion for determining whether audio data reproduced by the reproducing portion is the compressed audio data or the non-compressed audio data.

When the discriminating portion determines that the audio data is the compressed audio data, the display portion indicates the track number of the compressed audio data in the track number display area and the minute display area, the value of minute of the reproduction time of the compressed audio data in the second display area, and the value of second of the reproduction time of the compressed audio data in the frame display area.

It may be arranged that when the discriminating portion determines that the audio data is the compressed audio data, namely, when the function usable for reproducing non-compressed audio data cannot be used, the display portion displays an indication representing that the audio data reproduced by the reproducing portion is the compressed audio data.

DETAILED DESCRIPTION OF THE PREFERRED EMBODIMENTS

Hereinbelow, an embodiment of the present invention will be described with reference to the drawings.

In this embodiment, a recording medium reproducing apparatus is a CD player that can play back a CD-R, CD-RW or the like recording therein compressed audio data compressed by the MP3 compression technique, and a CD-DA.

Figure 1:
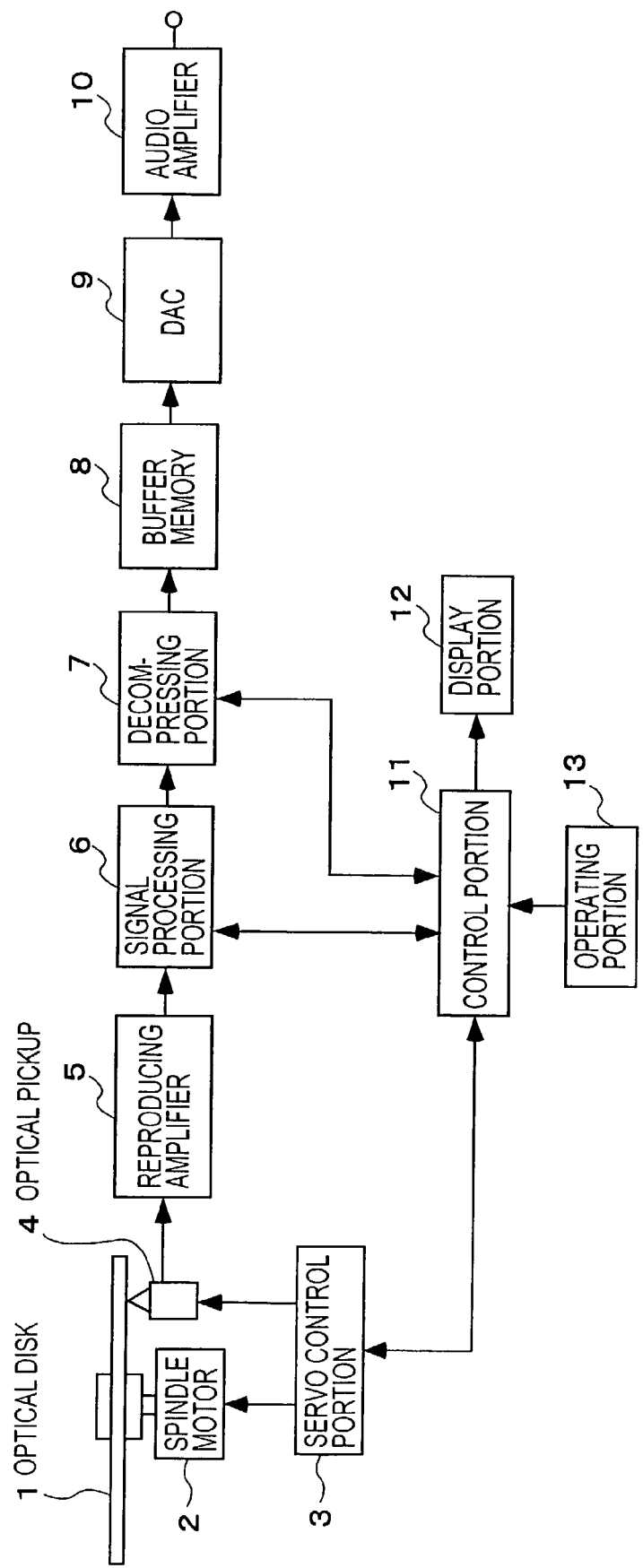
FIG. 1 is a block diagram showing a recording medium reproducing apparatus according to an embodiment of the present invention.

FIG. 1 is a block diagram of a recording medium reproducing apparatus according to the embodiment of the present invention.

Figure 2:
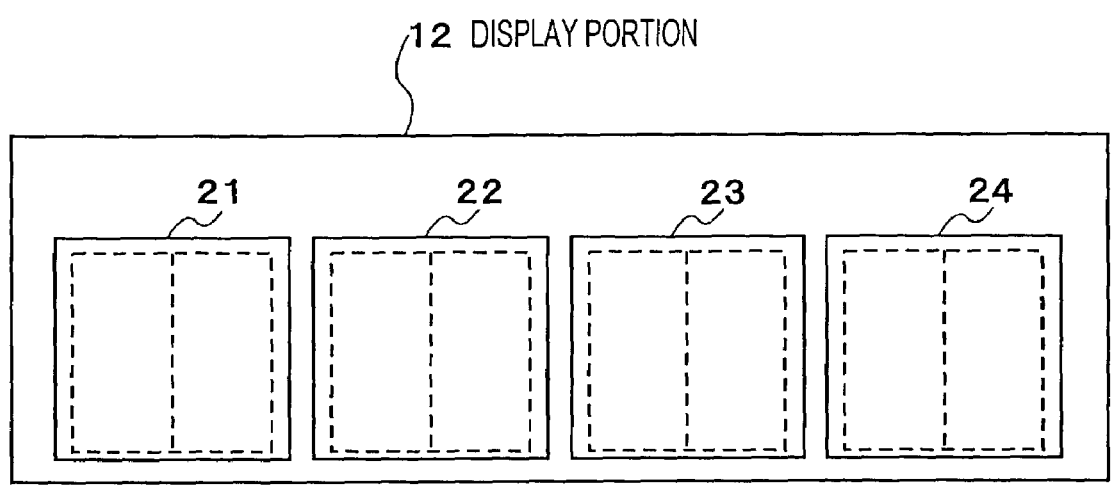
FIG. 2 is a diagram showing a structure of a display portion of the recording medium reproducing apparatus.

In FIG. 1, reference numeral 1 denotes an optical disk, 2 a spindle motor, 3 a servo control portion, 4 an optical pickup, 5 a reproducing amplifier, 6 a signal processing portion, 7 an decompressing portion, 8 a buffer memory, 9 a digital-to-analog converter (DAC), 10 an audio amplifier, 11 a control portion, 12 a display portion, and 13 an operating portion. The optical disk 1 is a CD-DA, CD-R, CD-RW or the like. FIG. 2 is a diagram showing a structure of the display portion 12 of the recording medium reproducing apparatus of this embodiment.

As shown in FIG. 1, the display portion 12 connected to the control portion 11 comprises a track number display area 21 for indicating a track number of non-compressed audio data in two digits, a minute display area 22 for indicating a value of minute of a reproduction time of non-compressed audio data in two digits, a second display area 23 for indicating a value of second of a reproduction time of non-compressed audio data in two digits, and a frame display area 24 for indicating a value of frame of non-compressed audio data in two digits. On the other hand, the operating portion 13 connected to the control portion 11 as shown in FIG. 1 comprises a reproduce button, a reproduce pause button, a reproduce stop button, a fast forward button, a fast rearward button and a track search button.

The control portion 11 comprises a discriminating portion for determining whether audio data recorded in the optical disk 1 is non-compressed audio data or compressed audio data. The discriminating portion makes such determination by checking whether TOC information of the optical disk 1 placed on a turntable includes index information representing absolute times (minute, second, frame), or later-described address information. When the index information is reproduced, the control portion 11 determines that the audio data recorded in the optical disk 1 is non-compressed audio data. In TOC information of the optical disk 1 recording therein compressed audio data, the foregoing index information representing the absolute times is not included, while address information representing locations of files of the compressed audio data is included. Therefore, when the address information is reproduced, the control portion 11 determines that the audio data recorded in the optical disk 1 is the compressed audio data.

When reproducing the compressed audio data, the control portion 11 counts a reproduction time of compressed audio data of each file, and controls the display portion 12 to indicate the counted reproduction time.

The optical disk 1 is disposed on the turntable fixed to the spindle motor 2. When a reproduction start command is inputted from the operating portion 13, the servo control portion 3 executes a control to rotate the spindle motor 2 at a predetermined speed. Further, the servo control portion 3 controls a focus servo circuit and a tracking servo circuit for causing a laser beam emitted from the optical pickup 4 to correctly trace a pit string of the optical disk 1.

When non-compressed audio data is recorded in the optical disk 1, the optical pickup 4 emits a laser beam to the optical disk 1 to reproduce TOC information recorded in the optical disk 1. When index information, in the TOC information, representing absolute time information is reproduced, the control portion 11 determines that audio data recorded in the optical disk 1 is non-compressed audio data. Digital audio data reproduced by the optical pickup 4 is waveform-shaped and amplified by the reproducing amplifier 5 and then inputted to the signal processing portion 6. The signal processing portion 6 performs demodulation of the digital audio data and removal of synchronizing signals and error signals such as a focus error signal and a tracking error signal, and then inputs the digital audio data to the decompressing portion 7. When the discriminating portion in the control portion 11 determined that audio data recorded in the optical disk 1 is non-compressed audio data, the control portion 11 controls the decompressing portion 7 not to perform an decompression process, so that the digital audio data is inputted to the buffer memory 8. The digital audio data stored in the buffer memory 8 is inputted to the DAC 9. The DAC 9 converts the digital audio data into an analog audio signal, and inputs it to the audio amplifier 10. The audio amplifier 10 amplifies the analog audio signal and outputs it through a speaker or the like.

On the other hand, when compressed audio data is recorded in the optical disk 1, the optical pickup 4 emits a laser beam to the optical disk 1 to reproduce TOC information recorded in the optical disk 1. By reproducing address information, the control portion 11 determines that audio data recorded in the optical disk 1 is compressed audio data. Digital audio data reproduced by the optical pickup 4 is waveform-shaped and amplified by the reproducing amplifier 5 and then inputted to the signal processing portion 6. The signal processing portion 6 performs removal of synchronizing signals and error signals such as a focus error signal and a tracking error signal, and then inputs the digital audio data to the decompressing portion 7. The decompressing portion 7 decompresses the compressed digital audio data and inputs the decompressed digital audio data to the buffer memory 8. The digital audio data stored in the buffer memory 8 is inputted to the DAC 9. The DAC 9 converts the digital audio data into an analog audio signal, and inputs it to the audio amplifier 10. The audio amplifier 10 amplifies the analog audio signal and outputs it through a speaker or the like.

Figure 3:
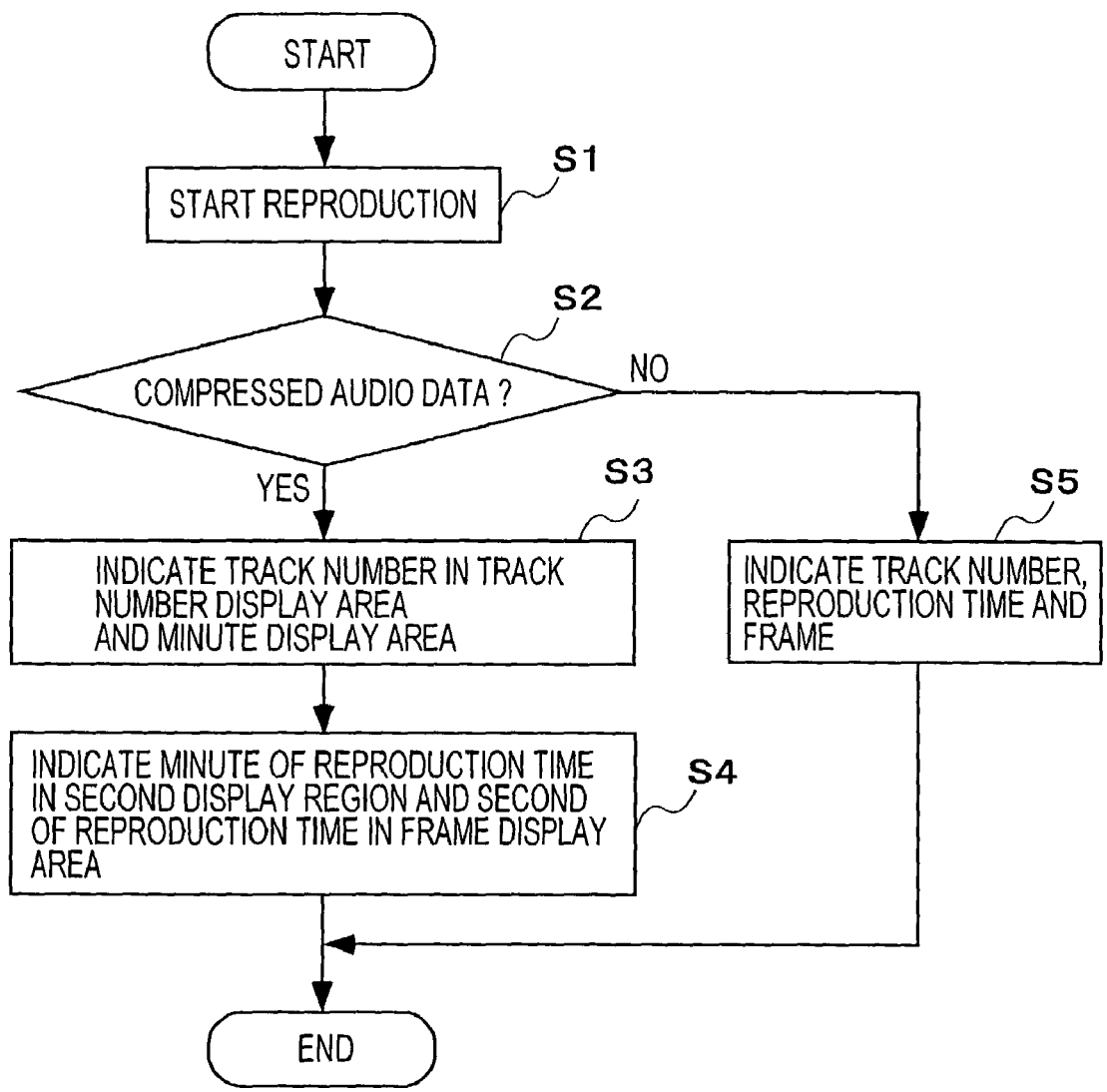
FIG. 3 is a flowchart for explaining a display method according to the embodiment of the present invention.
Figure 4A:
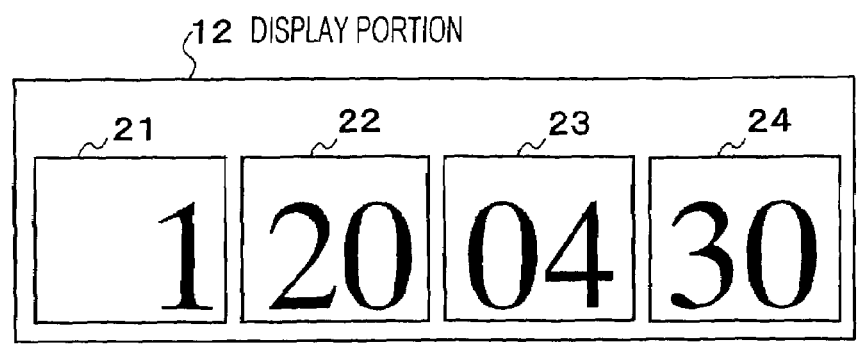
FIGS. 4A to 4D are diagrams showing display examples when compressed audio data is reproduced, according to the embodiment of the present invention.
Figure 4B:
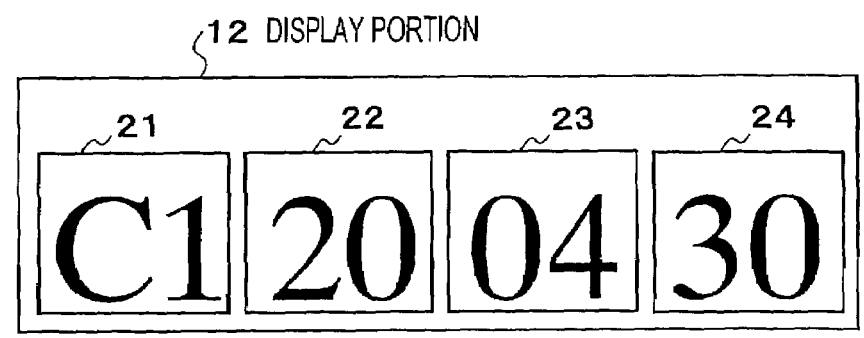
Figure 4C:
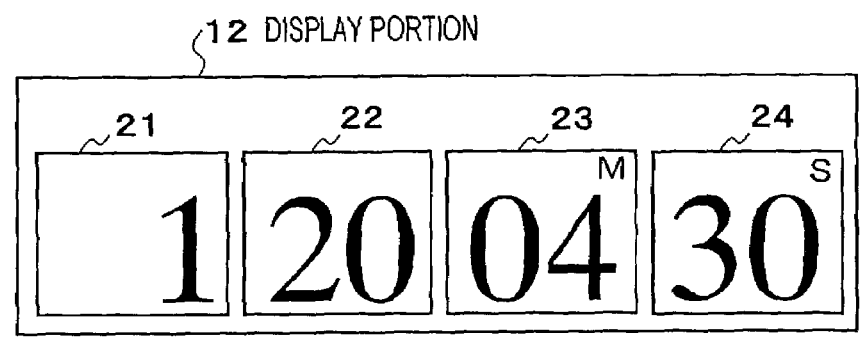
Figure 4D:
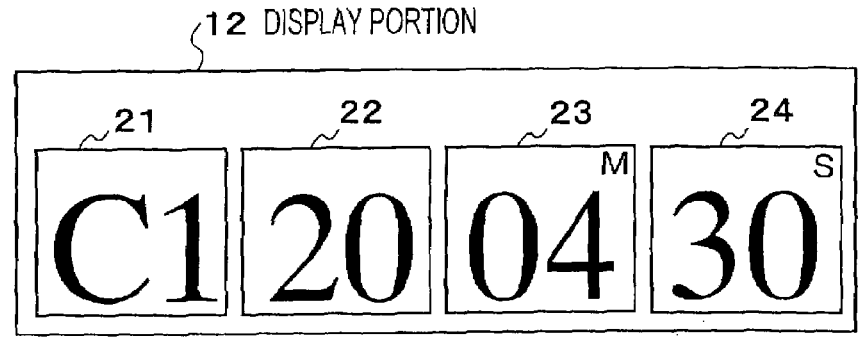
Figure 5:
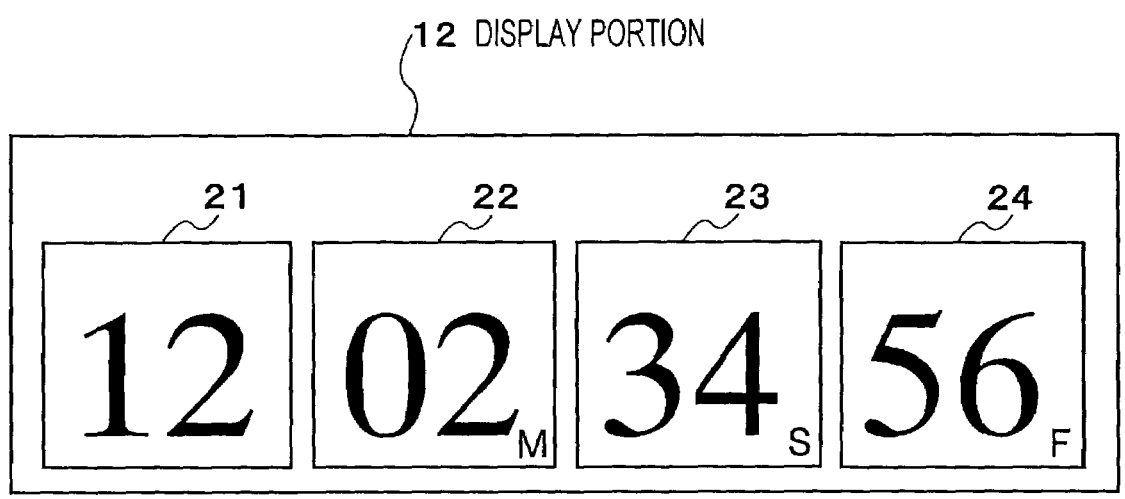
FIG. 5 is a diagram showing a display example when non-compressed audio data is reproduced, according to the embodiment of the present invention.

FIG. 3 is a flowchart for explaining a display method for a track number and a reproduction time performed by the display portion 12 of the recording medium reproducing apparatus in this embodiment. FIGS. 4A to 4D are diagrams showing display manners in the display portion 12 when compressed audio data is reproduced. FIG. 5 is a diagram showing a display manner in the display portion 12 when non-compressed audio data is reproduced.

At step S1 in FIG. 3, when the optical disk 1 is set on the turntable and the reproduce start button in the operating portion 13 is pushed, to reproduce the optical disk 1, the control portion 11 controls the spindle motor 2, the servo control circuit 3 and the optical pickup 4, thereby reproduction of data recorded in the optical disk 1 is started Then, at step S2 in FIG. 3, the control portion 11 determines whether audio data recorded in the optical disk 1 is non-compressed audio data or compressed audio data. If the control portion 11 determines that the audio data is the compressed audio data, the routine proceeds to step S3 in FIG. 3. On the other hand, if the control portion 11 determines that the audio data is the non-compressed audio data, the routine proceeds to step S5 in FIG. 3. Specifically, when index information, in TOC information of the optical disk 1, representing absolute time information is reproduced, the discriminating portion of the control portion 11 determines that the audio data is the non-compressed audio data. On the other hand, when address information in the TOC information is reproduced, it determines that the audio data is the compressed audio data.

At step S3 in FIG. 3, the control portion 11 controls the display portion 12 to indicate a track number of the compressed audio data being reproduced, in the track number display area 21 and the minute display area 22. For example, if a track of the compressed audio data being reproduced corresponds to a file of the compressed audio data recorded at the 120th location in the program area of the optical disk 1 from the radially innermost side toward the radially outermost side, a track number of "120" is indicated in the track number display area 21 and the minute display area 22 as shown in FIG. 4A.

At step S4 in FIG. 3, the control portion 11 controls the display portion 12 to indicate a value of minute of a reproduction time of the track of the compressed audio data being reproduced, in the second display area 23, and a value of second of the reproduction time of the track in the frame display area 24. For example, the control portion 11 counts a reproduction time of a track being reproduced and, when minute of the reproduction time is "4", the control portion 11 indicates "4" in the second display area 23 and, when second of the reproduction time is "30", the control portion 11 indicates "30" in the frame display area 24, as shown in FIG. 4A.

At step S5 in FIG. 3, the control portion 11 controls the display portion 12 to indicate a track number of the non-compressed audio data being reproduced in the track number display area 21, a value of minute of a reproduction time of the non-compressed audio data in the minute display area 22, a value of second of the reproduction time of the non-compressed audio data in the second display area 23, and a value of frame of the non-compressed audio data in the frame display area 24.

Based on subcode data of the track now under reproduction, the control portion 11 executes a control of indicating the track number, the minute, second and the frame value of the reproduction time, in the display portion 12. The subcode data includes information such as a track number, minute, second and frame value or the like of a reproduction time of a track being reproduced. As shown in FIG. 5, for example, a track number "12" is indicated in the track number display area 21, a value "2" of minute of a reproduction time is indicated in the minute display area 22, a value "34" of second of the reproduction time is indicated in the second display area 23, and a frame value "56" is indicated in the frame display area 24. Further, "M" (Minute) is indicated on the lower-right side of the value of minute of the reproduction time indicated in the minute display area 22, "S" (Second) is indicated on the lower-right side of the value of second of the reproduction time indicated in the second display area 23, and "F" (Frame) is indicated on the lower-right side of the frame value indicated in the frame display area 24.

When reproducing the compressed audio data, because the index information representing the absolute time information (minute, second, frame) is not included in the TOC information, the frame value can not be indicated in the frame display area 24. Therefore, in this embodiment, the value of minute of the reproduction time of the compressed audio data is indicated in the second display area 23, and the value of second of the reproduction time of the compressed audio data is indicated in the frame display area 24. With this arrangement, even if a track number has three digits, the track number can be correctly indicated in the track number display area 21 and the minute display area 22.

Now, another display method performed in the display portion 12 of the recording medium reproducing apparatus in this embodiment will be described.

At step S2 in FIG. 3, when the control portion 11 determines that audio data recorded in the optical disk 1 is compressed audio data, it controls the display portion 12 to display an indication representing that the reproducing audio data is the compressed audio data. As such an indication, for example, as shown in FIG. 4B, "C" (Compression) is indicated before the track number indicated in the track number display area 21 and the minute display area 22. Alternatively, as shown in FIG. 4C, "M" representing minute is indicated on the upper-right side of the value of minute of the reproduction time indicated in the second display area 23, and "S" representing second is indicated on the upper-right side of the value of second of the reproduction time indicated in the frame display area 24. Alternatively, "C" representing compression, "M" representing minute and "S" representing second are indicated as shown in FIG. 4D. By indicating "M" in the second display area 23 and "S" in the frame display area 24, a user can confirm that the positions for indicating values of minute and second of the reproduction time have been changed.

Further, by indicating "C" representing reproduction of compressed audio data, a user can easily understand from the indication in the display portion 12 whether audio data being reproduced is non-compressed audio data or compressed audio data.

In the foregoing embodiment, explanation has been made of the reproducing apparatus that reproduces audio data compressed by the MP3 compression technique. However, it may be replaced with another reproducing apparatus that reproduces audio data compressed by another compression technique. Further, in the foregoing embodiment, explanation has been made of the optical disk, such as the CD-R or CD-RW, as the information recording medium. However, it is not limited to the optical disks but a memory card, memory stick or the like can also be used. Further, a reproducing apparatus that can reproduce data from the memory card, memory stick or the like can also be used.

As described above, according to the present invention, when playing back an information recording medium recording therein compressed audio data, a track number of three or more digits can be indicated using a display portion that is designed to indicate a track number in two digits. Further, the display portion can indicate whether reproducing audio data is compressed audio data or not.

What is claimed is:

1. A recording medium reproducing apparatus having a reproducing portion for reproducing compressed audio data and non-compressed audio data recorded in recording media, said recording medium reproducing apparatus comprising:

a display portion comprising a track number display area for indicating a track number of the non-compressed audio data, a minute display area for indicating a value of minute of a reproduction time of the non-compressed audio data, a second display area for indicating a value of second of the reproduction time of the non-compressed audio data, and a frame display area for indicating a value of frame of the non-compressed audio data; and a discriminating portion for determining whether audio data reproduced by said reproducing portion is the compressed audio data or the non-compressed audio data, wherein when said discriminating portion determines that the audio data is the compressed audio data, said display portion indicates the track number of the compressed audio data in said track number display area and said minute display area, the value of minute of a reproduction time of the compressed audio data in said second display area, and the value of second of the reproduction time of the compressed audio data in said frame display area.

2. The recording medium reproducing apparatus according to claim 1, wherein when said discriminating portion determines that the audio data is the compressed audio data, said display portion displays an indication representing that the audio data being reproduced by said reproducing portion is the compressed audio data.

* * * * *